(12) United States Patent
Kliegman et al.

(10) Patent No.: US 9,171,433 B1
(45) Date of Patent: Oct. 27, 2015

(54) USE OF NFC IN CONJUNCTION WITH OTHER RANGE-BASED SENSORS TO DETECT THEFT OF OTHER DEVICES

(75) Inventors: Jonathan Kliegman, Kitchener (CA); Behdad Esfahbod, Kitchener (CA)

(73) Assignee: Google Inc., Mountain View, CA (US)

( * ) Notice: Subject to any disclaimer, the term of this patent is extended or adjusted under 35 U.S.C. 154(b) by 839 days.

(21) Appl. No.: 13/174,491

(22) Filed: Jun. 30, 2011

(51) Int. Cl.
*G08B 13/14* (2006.01)
*G08B 1/08* (2006.01)
*H04M 11/10* (2006.01)

(52) U.S. Cl.
CPC . *G08B 1/08* (2013.01); *H04M 11/10* (2013.01)

(58) Field of Classification Search
CPC .......... H04M 11/10; G08B 13/14; G08B 1/08
USPC ............. 455/41.1, 456, 413; 340/5.62, 568.1, 340/539.32
See application file for complete search history.

(56) References Cited

U.S. PATENT DOCUMENTS

| | | | | |
|---|---|---|---|---|
| 4,942,393 A | * | 7/1990 | Waraksa et al. | 340/5.62 |
| 5,963,131 A | * | 10/1999 | D'Angelo et al. | 340/568.1 |
| 8,810,392 B1 | * | 8/2014 | Teller et al. | 340/539.32 |
| 2008/0261564 A1 | * | 10/2008 | Logan | 455/413 |
| 2010/0181961 A1 | * | 7/2010 | Novak et al. | 320/108 |
| 2012/0289153 A1 | * | 11/2012 | Dobyns | 455/41.1 |

* cited by examiner

*Primary Examiner* — Steven Lim
*Assistant Examiner* — Kaleria Knox
(74) *Attorney, Agent, or Firm* — Leydig, Voit & Mayer, LTD.

(57) ABSTRACT

A system and method for monitoring devices using near field communications (NFC) techniques is disclosed. A plurality of host devices each incorporates a NFC device. An audio or visual alert device is incorporated into each host device and is coupled to its associated NFC device. A detector has a detector NFC device. A monitor is incorporated in the detector and is coupled to the detector NFC device. An alert activator in each host device is coupled to the associated NFC device and associated alert device and activates the associated alert device when one of the host NFC devices moves out of communication range with another host NFC device. A monitor activator in the detector device coupled to the detector NFC device and the monitor activates the monitor when the one NFC device moves out of communication range with the other NFC device.

16 Claims, 3 Drawing Sheets

USE OF NFC IN CONJUNCTION WITH OTHER RANGE-BASED SENSORS TO DETECT THEFT OF OTHER DEVICES

BACKGROUND

1. Field of the Disclosure

The present disclosure relates generally to near field communications.

2. Background

Near field communication, or NFC, is a set of short-range wireless technologies. NFC generally operates at 13.56 MHz and at rates ranging from about 106 kbit/s to 848 kbit/s. NFC always involves a reader (or initiator) and a tag (or target); the reader actively generates an RF field that can power a passive tag. This enables NFC tags to be configured so as to have very simple form factors such as tags, stickers, key fobs, or cards that do not require batteries. NFC peer-to-peer communication is of course possible, where both devices are powered. Devices that contain both reader and tag capabilities are called controllers.

Generally, NFC requires that NFC devices be present within a relatively close proximity to each other so that their corresponding magnetic fields can exchange information. Typically, a first NFC device transmits or generates a magnetic field modulated with information, such as the identity of the device into which they are incorporated. Thus a NFC device incorporated into a smartphone can contain information about the identity of the smartphone, among other things. This magnetic field inductively couples onto a second NFC device that is proximate to the first NFC device. The second NFC device may respond to the first NFC device by transmitting or generating its own modulated magnetic field and inductively coupling this magnetic field to the first NFC device.

Near field communications (NFC) devices can be integrated into a variety of portable or mobile devices, such as laptop or tablet computers, portable game devices, mobile phones, smartphones, etc., for example, to facilitate the use of these portable and mobile devices in conducting daily transactions.

The relatively small size of portable and mobile devices make them easy to lose or be stolen. A rider in a taxi can very easily put his/her mobile phone down on the seat beside them and then forget to take it when they get out of the taxi. A person sitting at a table in a café may walk away for a moment while leaving their mobile phone or tablet computer sitting on the table. A thief can quickly scoop up the phone or computer and walk off with it before anyone notices what has happened.

BRIEF SUMMARY OF THE DISCLOSURE

A system and method for monitoring devices using near field communications (NFC) techniques is disclosed. A plurality of host devices each incorporates a NFC device. An audio or visual alert device is incorporated into each host device and is coupled to its associated NFC device. A detector has a detector NFC device. A monitor is incorporated in the detector and is coupled to the detector NFC device. An alert activator in each host device is coupled to the associated NFC device and associated alert device and activates the associated alert device when one of the host NFC devices moves out of communication range with another host NFC device. A monitor activator in the detector device coupled to the detector NFC device and the monitor activates the monitor when the one NFC device moves out of communication range with the other NFC device.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments will be described with reference to the accompanying drawings. Generally, the drawing in which an element first appears is typically indicated by the leftmost digit(s) in the corresponding reference number.

DETAILED DESCRIPTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the following description is to be described in terms of NFC, those skilled in the relevant art(s) will recognize that embodiments may be applicable to other communications that use the near field and/or the far field without departing from the spirit and scope of the present invention. For example, although embodiments are to be described using NFC capable communication devices, those skilled in the relevant art(s) will recognize that functions of these NFC capable communication devices may be applicable to other communications devices that use the near field and/or the far field without departing from the spirit and scope of the present invention.

Figure 1:
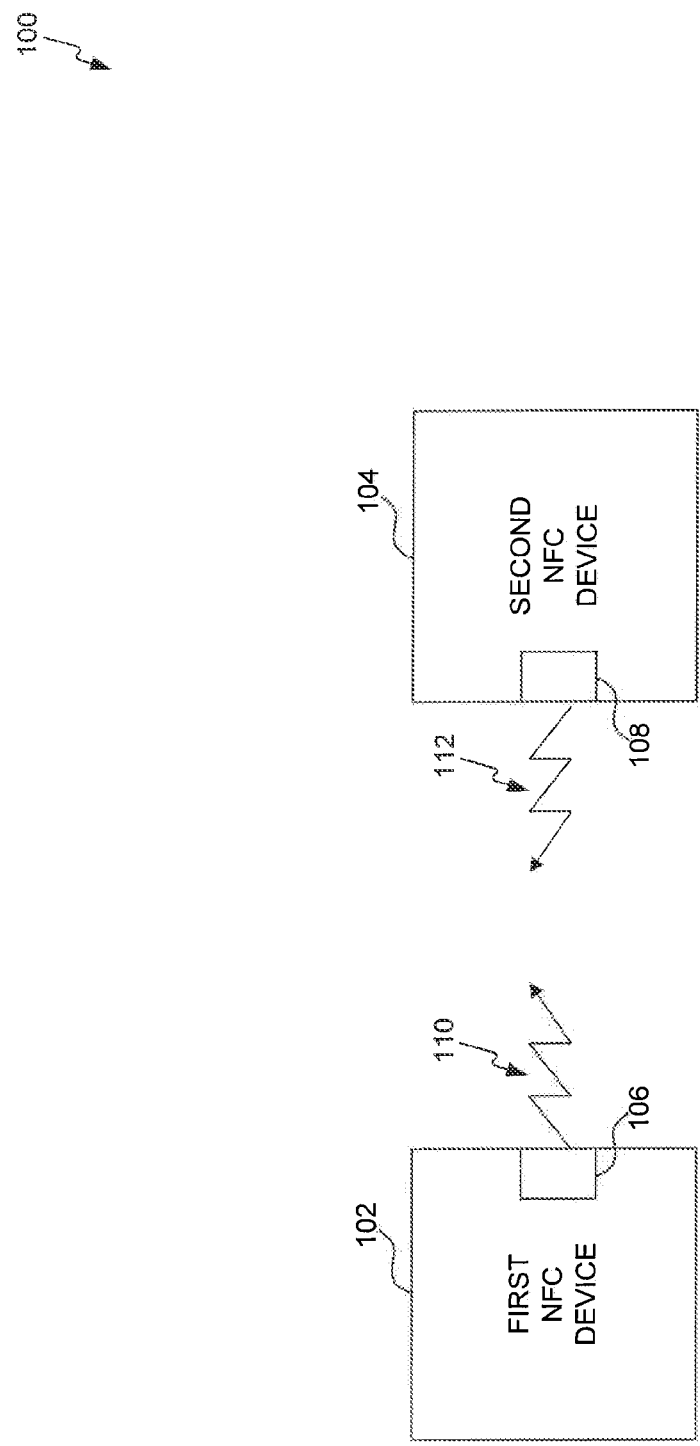
FIG. 1 shows a block diagram of an NFC environment.

FIG. 1 illustrates a block diagram of a NFC environment according to an exemplary embodiment. A NFC environment 100 provides wireless communication of information among a first NFC device 102 and a second NFC device 104 that are closely proximate to each other. The information may include one or more commands to be executed by the first NFC device 102 and/or the second NFC device 104, data from one or more data storage devices that is to be transferred to the first NFC device 102 and/or the second NFC device 104, or any combination thereof. The data storage devices may include one or more contactless transponders, one or more contactless tags, one or more contactless smartcards, or any other machine-readable media that will be apparent to those skilled in the relevant art(s) without departing from the spirit and scope of the invention, or any combination thereof. The other machine-readable media may include, but are not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples.

NFC devices 102 and 104 may be any of three types of devices. One type is a tag, or target. A tag is passive. A tag contains data or commands. When brought into communication with another device, the tag transfers data or commands to the second device. As one example, a tag may be an ID card that permits access to a building when the data stored on the tag is read. A second type is a reader, or initiator. A reader generates an electromagnetic field which is modulated by a tag. An example of a reader may be the unit mounted on the building wall that reads the information stored in the tag. The reader reads data stored on the tag and may take action based on the received information. A controller is a device that incorporates features of both a tag and a reader. Thus a controller may act as a tag, or a reader, or both. Readers and controllers are generally powered devices; whereas a tag or target does not require its own power supply. For purposes of the present disclosure, a tag, a reader, and a controller will be referred to herein individually and collectively as a "NFC device."

The first NFC device 102 and/or the second NFC device 104 may be implemented as a standalone or a discrete device or may be incorporated within or coupled to larger electrical devices or host devices such as mobile telephones, portable computing devices, other computing devices such as personal, laptop, tablet, or desktop computers, computer peripherals such as printers, portable audio and/or video players, television receivers, a payment system, ticket writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention.

The first NFC device 102 and/or the second NFC device 104 interact with each other to exchange information such as data and/or one or more commands to be executed by the first NFC device 102 and/or the second NFC device 104. Each NFC device 102 and 104 contains an antenna 106 and 108, respectively, to enable NFC devices 102 and 104 to communicate with each other. One example of such communications is a peer-to-peer (P2P) communications mode or a reader/writer (R/W) communications mode. In the P2P communications mode, the first NFC device 102 and the second NFC device 104 may be configured to operate according to an active communications mode and/or a passive communications mode. The first NFC device 102 modulates first information onto a first carrier wave, referred to as a modulated data communication, and generates a first magnetic field by applying the modulated data communications to the first antenna 106 to provide a first data communications 110. The first NFC device 102 ceases to generate the first magnetic field after transferring the first information to the second NFC device 104 in the active communications mode via the second antenna 108. Alternatively, in the passive communications mode, the first NFC device 102 continues to apply the first carrier wave without the first information, referred to as an unmodulated data communication, to continue to provide the first data communications 110 once the first information has been transferred to the second NFC device 104.

In a communication mode, the first NFC device 102 is sufficiently closely proximate to the second NFC device 104 that the first data communications 110 is inductively coupled onto the second antenna 108 of the second NFC device 104. The second NFC device 104 demodulates the first data communications 110 to recover the first information. The second NFC device 104 may respond to the first information by modulating second information onto a second carrier wave and generating a second magnetic field by applying this modulated data communications to the second antenna 108 to provide a second modulated data communications 112 in the active communications mode. Alternatively, the second NFC device 104 may respond to the first information by modulating the first carrier wave that is inductively coupled onto the second antenna 108 with the second information to provide the second modulated data communications 112 in the passive communications mode.

In the R/W communications mode, the first NFC device 102 is configured to operate in an initiator, or reader, mode and the second NFC device 102 is configured to operate in a target, or tag, mode. This example is not limiting. Those skilled in the relevant art(s) will recognize that the first NFC device 102 may be configured to operate in the tag mode and the second NFC device 104 may be configured to operate in the reader mode in accordance with the teachings herein without departing from the spirit and scope of the present invention. The first NFC device 102 modulates the first information onto the first carrier wave and generates the first magnetic field by applying the modulated data communications to the first antenna 106 to provide the first data communications 110. The first NFC device 102 continues to apply the first carrier wave without the first information to continue to provide the first data communications 110 once the first information has been transferred to the second NFC device 104. The first NFC device 102 is sufficiently closely proximate to the second NFC device 104 that the first data communications 110 is inductively coupled onto the second antenna 108 of the second NFC device 104.

The second NFC device 104 derives or harvests power from the first data communications 110 to recover, to process, and/or to provide a response to the first information. The second NFC device 104 demodulates the first data communications 110 to recover the first information. The second NFC device 104 processes the first information. The second NFC device 104 may respond to the first information by modulating the second information onto the second cart' er wave and generating the second magnetic field by applying this modulated data communications to the second antenna 108 to provide the second modulated data communications 112.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Keeping track of small portable devices using NFC can be accomplished by incorporating NFC devices into the portable devices, called "host devices." The NFC devices can communicate with each other and/or with a separate detector device. The NFC devices can generate an alert when one host device is out of communication range of the other host devices and/or the detector device.

Figure 2:
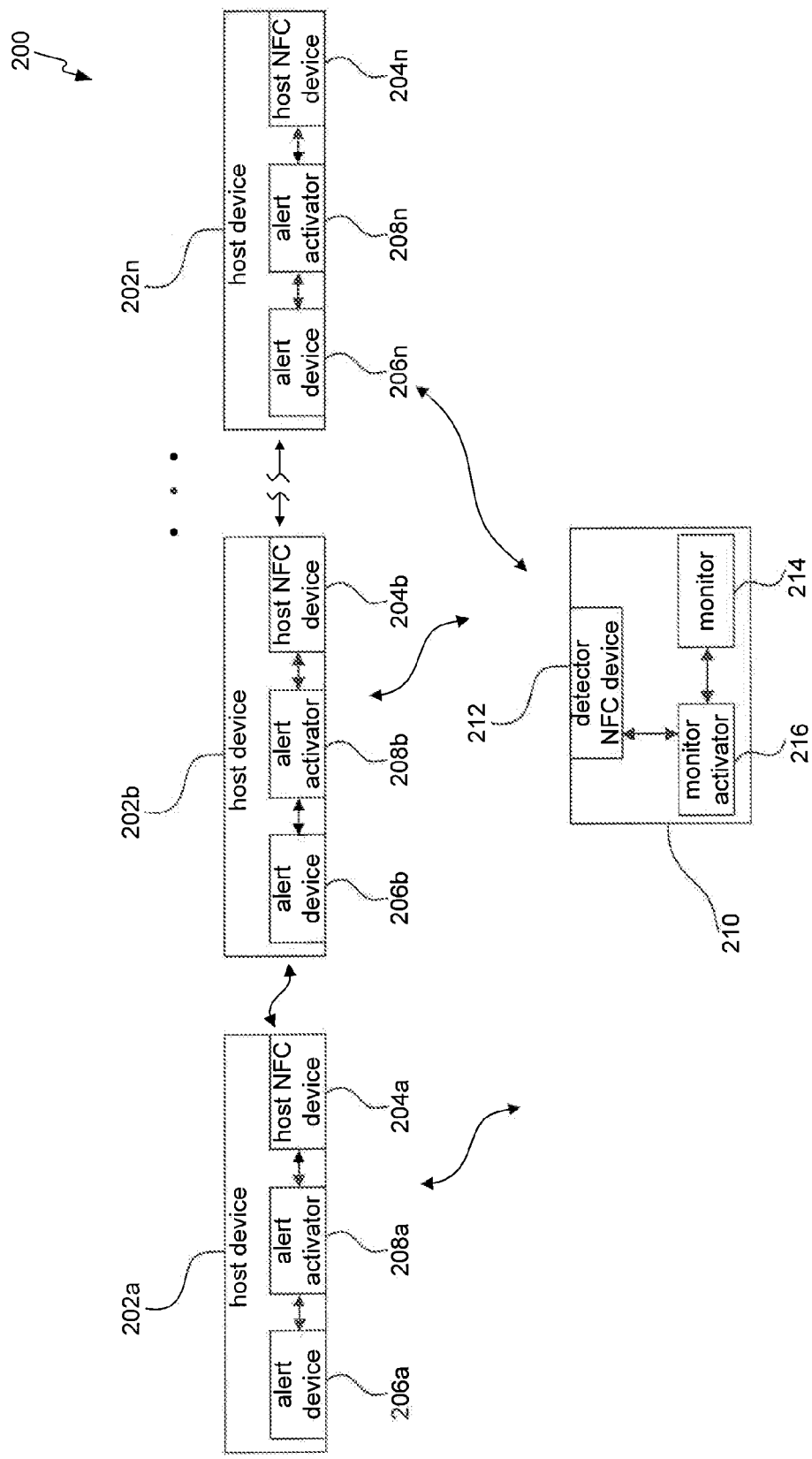
FIG. 2 shows an exemplary embodiment of the NFC communications system described herein.

FIG. 2 shows an embodiment 200 in which multiple NFC devices incorporated into portable or mobile devices communicate with each other and with a detector NFC device. A plurality of host devices 202a, 202b, . . . , 202n, contain within them respective NFC devices 204a, 204b, . . . , 204n. Each host device 202a, 202b, . . . , 202n also contains an alert device 206a, 206b, . . . , 206n. Alert devices 206a, 206b, 206n are operatively (e.g., electrically or magnetically) coupled to their respective NFC device 204, 204, . . . , 204n through respective alert activators 208a, 208b, . . . , 208n.

For convenience, host devices 202a, 202b, . . . , 202n, will be referred to collectively as host devices 202. NFC devices 204a, 204, . . . , 204n, will be referred to collectively as NFC devices 204. Alert devices 206a, 206b, . . . , 206n, will be referred to collectively as alert devices 206. Alert activators 208a, 208b, . . . , 208n will be referred to collectively as alert activators 208.

Alert devices 206 may incorporate audio alerts, such as an alert which emits a continuous or intermittent beeping or buzzing sound and/or a visual alert, such as, a blinking or steady light from a light emitting diode (LED) or the like.

Host device 202 may be any number of devices, such as, but not limited to, a laptop or tablet computer, a mobile phone, a portable game device, or any other portable or mobile device that is of relatively small size such that it would be capable of being relatively easy to be lost or stolen. NFC device 204 may or may not be operatively connected to other operating equipment incorporated into host device 202. NFC device may or may not contain information about host device 202.

A detector device 210 is separate and distinct from host devices 202. Detector device 210 incorporates a NFC device 212 and a monitor 214 that is operatively (e.g., electrically or magnetically) coupled to detector NFC device 212 through a monitor activator 216.

A user may carry one or more host devices 202 with them. For example, host devices 202 may be one or more of a tablet computer, a smartphone, and an MP3 audio player. Each host device will have an NFC device 204 incorporated in it. In addition, a user will carry a detector device 210 that incorporates a detector NFC device 212.

Detector device 210 is typically small and lightweight. Detector device 210 could be sewn into an article of clothing worn by the user, or could be incorporated into a key fob or the like that the user can carry on his/her person.

Figure 3:
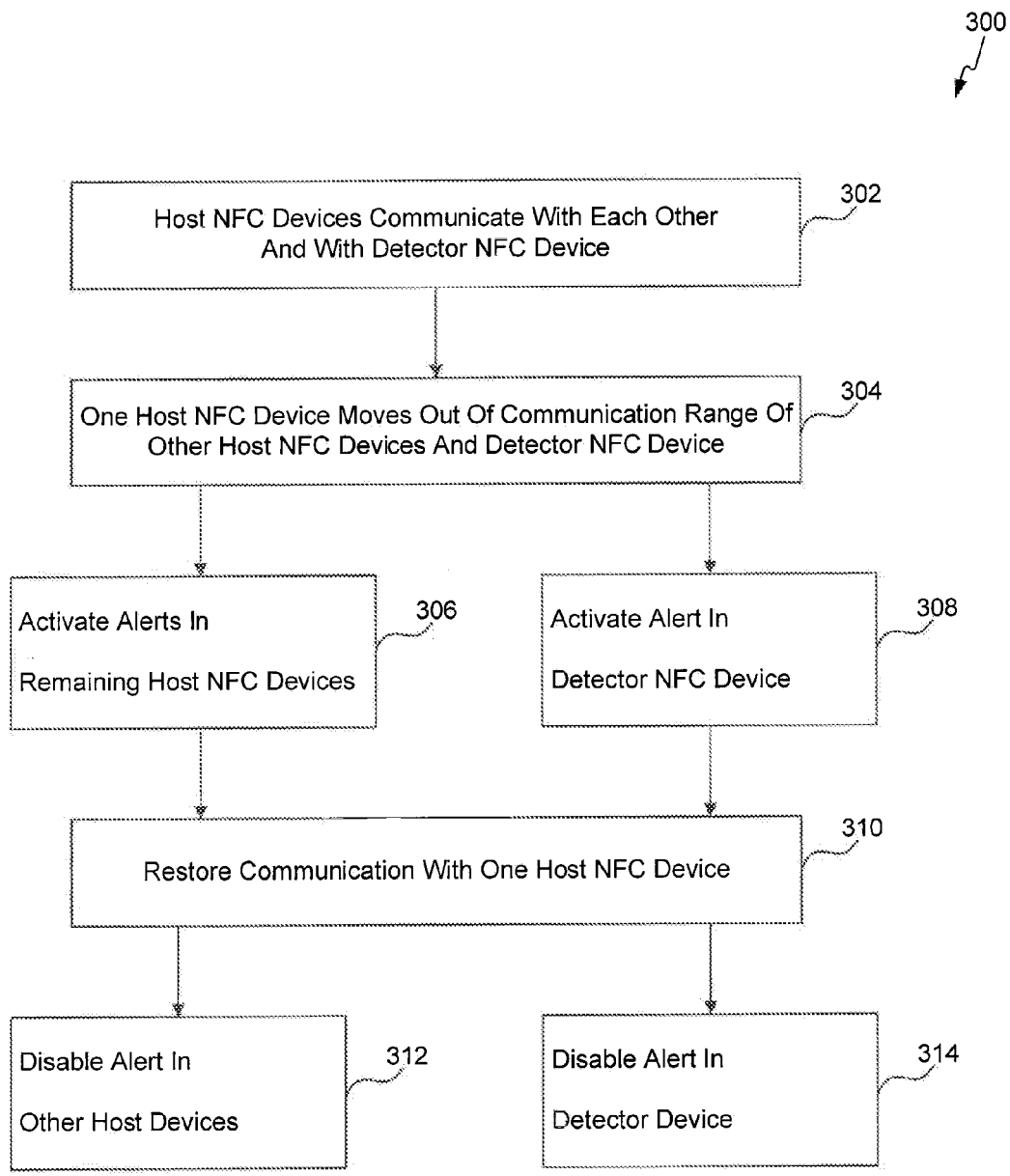
FIG. 3 is a flow chart showing the operation of an embodiment of the NFC communication system described herein.

FIG. 3 is a flowchart 300 of the operation of the NFC devices. In operation, at step 302, host NFC devices 204 communicate with each other and with detector NFC device 212. As long as host devices 202 are maintained in close proximity to each other and to detector device 210, such that host NFC devices 204 communicate with each other and with detector NFC device 212, no alerts will be activated.

It is possible, as shown in step 304, that a host device 202 (e.g., host device 202a) will be moved out of communication range of the remaining host devices 204 and detector device 210, such that the associated host NFC device 204 (e.g., host NFC device 204a), can no longer communicate with the remaining host NFC devices (e.g., host NFC devices 204b, . . . , 204n) incorporated into the remaining host devices 202 (e.g., host devices 202b, . . . , 202n), or with detector device 210 and its associated detector NFC device 212. That can happen if the host device 202 (e.g., host device 202a) is left behind at a restaurant table, or is picked up by a thief, for example. In that case, as shown in step 306, each host NFC device will send a signal to its respective alert activator 208 to activate respective alert devices 206. In addition, as shown in step 308, detector NFC device 212 will send a signal to monitor activator 216 to cause it to activate monitor 214. Alert devices 206 and monitor 214 will emit audio and/or visual signals to announce to the user that at least one of host devices 202 and its associated host NFC device 204 has moved out of communication range of the remaining host NFC devices 204 and detector NFC device 212.

If and when the moved host device 202 (e.g., host device 202a) is moved back into close proximity with the other host devices 202 and detector 210, communications will be restored with the one host NFC device 204 (e.g., host NFC device 204a), as shown in step 310. At step 312, the alerts 206 in host devices 202 are then disabled. At step 314, monitor 214 in detector device 210 is also disabled.

It is often the case that a host device 202 is moved out of communication range of other host devices 202 momentarily or for a short period of time. This can happen if a smartphone is taken out of a case and placed next to the user's ear when making a call, or when the user holds it at arm's length to surf the web, for example. It would be annoying at the very least if an alert were to be activated each time this happens. Therefore, typically, the alert activators 208 will incorporate a delay of between several seconds and several minutes before they activate alerts 206. This will give the user time to input an unlock code into the host device. Unlock codes can be entered using a keypad (not shown) on host device 202. For those host devices 202 that are equipped with speech recognition modules, the unlock code can be entered orally by the user. Unlock code input mechanisms are well known to those skilled in the relevant arts.

Inputting the unlock code into a host device 202 (e.g., host device 202a) will cause the host NFC device 204 (e.g., host NFC device 204a) in that host device 202 (e.g., host device 202a) to send a signal to the other host NFC devices 204 (e.g., host NFC devices 204b, . . . , 204n) that host NFC device 204a is being disabled and is being safely moved out of communication range of the other host NFC devices 204. When the host device 202 (e.g., host device 202a) is again locked, either by entering a lock code on a keypad or orally by the user, or after a predetermined period of time of inactivity of host device 202a, the host NFC device 204 (e.g., host NFC device 204a) incorporated into that host device 202 will send a signal to the other host NFC devices 204 (e.g., host NFC devices 204b, . . . , 204n) and to detector NFC device 212 that host NFC device 204a is again enabled.

In addition, when a user arrives at a safe location, such as a home or an office, it is not uncommon for the user to separate the several host devices sufficiently that one or more of host devices 202 will be out of communication range with the other host devices 202. In that situation, a NFC device can be attached to a door frame, for example, or placed in such other convenient location at the safe location as to enable that safe location NFC device to communicate with host NFC devices 204 and detector NFC device 212 to disable them as long as they are within the environs of the safe location.

In a further variation, each host NFC device 204 has a distinct identity. When a given host NFC device moves out of communication range of the remaining host NFC devices and/or detector NFC device 212, the alert generated in each of host devices 202 and detector device 210 is distinct. For example, if host NFC device 204a is moved out of communication range, the audible alert could be one beep every 5 seconds; the visual alert could be lighting a red LED. If host NFC device 204b is moved out of communication range, the audible alert could be one beep each second; and the visual alert could be lighting a blue LED. Detector device 210 would be equipped with a monitor 214 that allows it to monitor each distinct host NFC device 204. This allows detector device 210 to quickly indicate which specific host NFC device 204 has moved out of communication range.

In a still further variation, when a given host NFC device moves out of communication range of the remaining host NFC devices and/or detector NFC device 212, an alert is generated only in detector NFC device 212. All host NFC devices can generate the same alert or, in accordance with the variation discussed above, each host NFC device can generate its own distinctive alert.

In the embodiments described above, a combination of NFC devices is used. For example, host NFC devices 204 could be a combination of readers and tags. At least one host NFC device 204 must be or act as a reader. The remaining host NFC devices must be or act as tags. Detector NFC device 212 can be or act as a tag. Since host devices 202 are most likely to be powered devices, then the easiest configuration is to make each host NFC device 204 a controller. In that case, each host NFC device 204 can act either as a tag or as a reader, as appropriate in a given situation. In summary, of the host NFC devices 204 that are in communication with each other at any one time, at least one device must act as a reader and the other device(s) must act as a tag. Detector NFC device 212 could always be or act as a tag, since detector 210, into which detector NFC is incorporated, would not likely be a powered device.

Alternatively, host NFC devices 204 could all be tags and detector NFC device 212 can be a reader. This requires detector NFC device 212 to be powered; whereas in this embodiment, host NFC devices need not be powered. In this embodiment, host NFC devices 204 do not communicate with each other. Host NFC devices communicate only with detector NFC device 212. Only monitor 214 is activated when one of host NFC devices 204 moves out of communication range of detector NFC device 212.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A system for monitoring devices using near field communications (NFC) techniques, comprising:
    a plurality of host devices each incorporating an NFC device;
    an audio or visual alert device incorporated into each host device and operatively coupled to the associated NFC device;
    a detector device incorporating a detector NFC device;
    a monitor incorporated in the detector device and operatively coupled to the detector NFC device;
    an alert activator in each host device coupled to the associated NFC device and associated alert device that activates the associated alert device when at least one of the NFC devices in a host device moves out of communication range with at least one other NFC device in its associated host device or the detector NFC device in its associated detector device;
    a monitor activator in the detector device coupled to the detector NFC device and the monitor that activates the monitor when the at least one NFC device moves out of communication range with the at least one other NFC device or the detector NFC device;
    a home location device separate from the NFC devices incorporated in the host devices and the detector NFC device; and
    a disabler incorporated into each host device and operatively coupled to the associated NFC device that disables the associated NFC device when the associated NFC device is in communication with the home location device.

2. The system of claim 1,
    wherein the home location device is an NFC device.

3. The system of claim 1, further comprising: an unlock code activator in each host device coupled to the NFC device in the associated host device that is configured to activate an unlock code in a given host device when that host device and its associated NFC device is moved out of communication range with at least one other NFC device in an associated host device.

4. The system of claim 3, wherein the unlock code activator is configured to activate the unlock code prior to the expiration of a predetermined period of time after the host device and its associated NFC device has moved out of communication range of the at least one other host device and its associated NFC device.

5. The system of claim 1, wherein the alert activator activates the associated alert only upon the expiration of a predetermined period of time after the at least one NFC device moves out of communication with the at least one other NFC device.

6. A monitoring device using near field communications (NFC) techniques, comprising:
- a detector device;
- a detector NFC device incorporated in the detector device;
- a monitor incorporated in the detector device and operatively coupled to the detector NFC device;
- an activator in the detector device that activates the monitor when the detector NFC device fails to receive a communication signal from another NFC device with which it has been in continuous communication, wherein the activator in the detector device is configured to suspend activating the monitor when the detector NFC device receives a signal indicating that the another NFC device has been disabled such that the NFC device may safely move out of communication range of the detector NFC device;
- a disabler operatively coupled to the activator that disables the activator when the detector device is in communication with a home location device; and
- an alarm generator that generates an alarm signal when the activator activates the monitor.

7. The monitoring device of claim 6, wherein the activator further comprises:
- a monitor activator that activates the monitor when the detector NFC device fails to receive a communication signal from the another NFC device for a predetermined period of time.

8. A method of monitoring devices using near field communications (NFC) techniques, comprising:
- placing a plurality of host devices each incorporating an NFC device in close proximity to each other;
- establishing a communication link from one NFC device to another;
- monitoring the communication link for each NFC device;
- detecting when at least one NFC device moves out of communication range of at least one other NFC devices;
- triggering an alert when the at least one NFC device has moved out of communication range of the at least one other NFC devices for a predetermined period of time; and
- stopping the detecting when each NFC device is in communication with a home location device.

9. The method of claim 8,
wherein the home location device is an NFC device.

10. The method of claim 8, further comprising:
- activating an unlock code in the at least one NFC device to disable the triggering of the alert.

11. The method of claim 10, further comprising:
- activating the unlock code prior to the expiration of the predetermined period of time.

12. A system for monitoring devices using near field communications (NFC) techniques, comprising:
- a host device incorporating a host NFC device;
- an audio or visual alert device incorporated into the host device and operatively coupled to the host NFC device;
- a detector device incorporating a detector NFC device;
- a monitor incorporated in the detector device and operatively coupled to the detector NFC device;
- an alert activator in the host device coupled to the host NFC device and alert device that activates the alert device when the host NFC device moves out of communication range with the detector NFC device;
- a monitor activator in the detector device coupled to the detector NFC device and the monitor that activates the monitor when the host NFC device moves out of communication range with the detector NFC device, wherein the monitor activator in the detector device is configured to suspend activating the monitor when the detector NFC device receives a signal indicating that the host NFC device has been disabled such that the host device may safely move out of communication range of the detector device; and
- a home location device separate from the host NFC device and the detector NFC device; and
- a disabler incorporated into the host device and operatively coupled to the host NFC device that disables the host NFC device when the host NFC device is in communication with the home location device.

13. The system of claim 12,
wherein the home location device is an NFC device.

14. The system of claim 12, further comprising:
- an unlock code activator in the host device coupled to the host NFC device that is configured to activate an unlock code in the host device when the host device and the host NFC device is moved out of communication range with the detector NFC device.

15. The system of claim 14, wherein the unlock code activator is configured to activate the unlock code prior to the expiration of a predetermined period of time after the host NFC device has moved out of communication range with the detector NFC device.

16. The system of claim 12, wherein the alert activator activates the alert only upon the expiration of a predetermined period of time after the host NFC device moves out of communication with the detector NFC device.

* * * * *